(12) United States Patent
Li et al.

(10) Patent No.: US 12,162,512 B2
(45) Date of Patent: Dec. 10, 2024

(54) SYSTEMS AND METHODS FOR ONBOARD ANALYSIS OF SENSOR DATA FOR SENSOR FUSION

(71) Applicant: FORD GLOBAL TECHNOLOGIES, LLC, Dearborn, MI (US)

(72) Inventors: Yinguang Li, Foster City, CA (US); Xiufeng Song, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 17/488,667

(22) Filed: Sep. 29, 2021

(65) Prior Publication Data
US 2023/0103178 A1   Mar. 30, 2023

(51) Int. Cl.
*B60W 60/00* (2020.01)
*G06F 18/25* (2023.01)
*G06V 20/56* (2022.01)

(52) U.S. Cl.
CPC ........... *B60W 60/001* (2020.02); *G06F 18/25* (2023.01); *G06V 20/56* (2022.01); *B60W 2420/403* (2013.01); *B60W 2420/408* (2024.01); *B60W 2554/4048* (2020.02)

(58) Field of Classification Search
CPC .......... B60W 60/001; B60W 2420/42; B60W 2420/52; B60W 2554/4048; G06F 18/25; G06V 20/56; G01S 7/295; G01S 13/726; G01S 13/931
See application file for complete search history.

(56) References Cited

U.S. PATENT DOCUMENTS

| 6,008,751 A | * | 12/1999 | Kudoh | ................. G01S 13/931 342/81 |
|---|---|---|---|---|
| 9,255,988 B2 | | 2/2016 | Zeng et al. | |
| 10,935,652 B2 | | 3/2021 | Branson | |

(Continued)

FOREIGN PATENT DOCUMENTS

| DE | 102018204590 A1 | 10/2019 |
|---|---|---|
| EP | 0936473 B1 | 7/2002 |
| EP | 3398824 A1 | 11/2018 |

OTHER PUBLICATIONS

Extended European Search Report for European Patent Application No. 22198862.9 dated Feb. 20, 2023, 12 pages.

(Continued)

*Primary Examiner* — Khoi H Tran
*Assistant Examiner* — Tien Minh Le
(74) *Attorney, Agent, or Firm* — Frank A. MacKenzie; Brooks Kushman P.C.

(57) ABSTRACT

Systems and methods for detecting and tracking objects using radar data are disclosed. The methods include receiving measurement data corresponding to an environment of a vehicle from a radar sensor associated with the vehicle, and identifying one or more object tracks of a plurality of object tracks that lie within an extended field of view (FOV) of the radar sensor. The extended FOV may be determined based on an original FOV of the radar sensor. The methods further include performing association of the measurement data with the one or more object tracks to identify an associated object track, and outputting the associated object track and the measurement data to a navigation system of the vehicle.

20 Claims, 6 Drawing Sheets

(56) References Cited

U.S. PATENT DOCUMENTS

| | | | | |
|---|---|---|---|---|
| 2006/0103927 | A1* | 5/2006 | Samukawa | G01S 17/931 |
| | | | | 359/436 |
| 2010/0104199 | A1* | 4/2010 | Zhang | G06V 20/588 |
| | | | | 382/199 |
| 2016/0209211 | A1* | 7/2016 | Song | G01S 7/4972 |
| 2017/0205506 | A1* | 7/2017 | Voorheis | G01S 13/66 |
| 2019/0361114 | A1* | 11/2019 | Kim | H01Q 3/34 |
| 2020/0174493 | A1* | 6/2020 | Lin | G05D 1/0285 |
| 2021/0003691 | A1* | 1/2021 | Zaidi | G01S 13/426 |
| 2021/0247509 | A1 | 8/2021 | Anno et al. | |
| 2022/0043108 | A1* | 2/2022 | Lavian | G01S 7/032 |

OTHER PUBLICATIONS

Gonzalez, David et al., A Review of Motion Planning Techniques for Automated Vehicles, IEEE Transactions on Intelligent Transportation Systems, vol. 17, Issue 4, Apr. 2016 (abstract).

Habtemariam, B., Effective Data Association Algorithms for Multitarget Tracking, 2014.

Duraisamy, B. et al., On Track-to-Track Data Association for Automotive Sensor Fusion, 18th International Conference on Information Fusion, Washington D.C., Jul. 6-9, 2015.

Andersson, A., Offline Sensor Fusion for Multitarget Tracking Using Radar and Camera Detections, KTH Royal Institute of Technology School of Computer Science and Communication, Stockholm, Sweden 2017.

* cited by examiner

SYSTEMS AND METHODS FOR ONBOARD ANALYSIS OF SENSOR DATA FOR SENSOR FUSION

BACKGROUND

Statement of the Technical Field

The present disclosure relates generally to automated systems. More particularly, the present disclosure relates to implementing systems and methods for onboard association of sensor measurements to object tracks.

Description of the Related Art

Object tracking and target profiling systems have been developed as part of system operation applications in various industries, including the aviation and automotive industries. These systems utilize periodic or continuous detection of objects and control algorithms to estimate various planar parameters of an object, such as the object range, range rate (i.e., closing or opening velocity), and azimuth position (i.e., bearing), as well as three-dimensional parameters where applicable, such as altitude or elevation, so as to avoid, follow, or otherwise survey the object. The ability of these systems to provide accurate estimations is crucial to achieving the desired benefits of their applications.

To improve the likelihood of object detection, a plurality of sensors is often utilized within a system. With respect to automotive applications, such as collision detection or lateral support systems, for example, these sensors may include GPS, radars, light detection and ranging (LiDAR) sensors, and camera/video image processors. Irrespective of application, however, these multiple-sensor generally operate to detect the same object, so as to provide back-up or redundant means of detection, and therefore, do not typically improve the overall accuracy of the system above that of the most accurate sensor. Moreover, where multiple-sensor configurations are utilized, multiple sets of data are generated for each detected object and statically stored as tracks. Due to the multiplication of data, the tracks may become voluminous over time, thereby requiring expensive and cumbersome data storage and manipulation both on-board the vehicle as well as remotely. Given that the computation and networking elements available on-board a vehicle are often many orders slower and smaller in capability than remote counterpart systems, techniques that reduce data storage and manipulation requirements are often desirable.

This document describes implementing systems and methods that are directed to addressing the above described problems and/or other issues.

SUMMARY

The present disclosure concerns implementing systems and methods for detecting and tracking objects using radar data. The methods may include receiving measurement data corresponding to an environment of a vehicle from a radar sensor associated with the vehicle, and identifying one or more object tracks of a plurality of object tracks that lie within an extended field of view (FOV) of the radar sensor. The extended FOV may be determined based on an original FOV of the radar sensor. The methods may also include performing association of the measurement data with the one or more object tracks to identify an associated object track, and outputting the associated object track and the measurement data to a navigation system of the vehicle. Optionally, the associated object track may be used to control navigation of the vehicle.

In some scenarios, the methods may also include identifying the original FOV of the radar sensor by determining a scan mode of the radar sensor based on the measurement data.

In one or more implementations, the extended FOV of the radar sensor may be computed by extending at least an azimuth coverage and a range of the original FOV of the radar sensor.

In certain other implementations, the methods may also include adding the one or more object tracks to a track buffer representative of a reduced track representation space.

Optionally, the one or more object tracks may be identified by, for each of the plurality of previously determined object tracks: identifying a track center point for that object track, transforming the track center point to a frame of reference corresponding to the radar sensor, and determining whether that track center point lies within the extended FOV of the radar sensor.

In various scenarios, the extended FOV of the radar sensor may be determined to account for a difference between a time of validity (ToV) of a latest track prediction of an object track and a ToV of the measurement data.

Optionally, performing association of the measurement data with the one or more object tracks to identify the associated object track may include identifying the associated object track as an object track of the one or more object tracks that has a shortest refined distance from among respective refined distances between each of the one or more object tracks and the measurement data, where each refined distance is based on a fused range rate and a position distance between the measurement data and the object track.

The implementing systems can comprise: a processor; and a non-transitory computer-readable storage medium comprising programming instructions that are configured to cause the processor to implement a method for operating an automated system. Additionally and/or alternatively, the non-transitory computer-readable storage medium and the programming instructions may be included in a computer program product.

BRIEF DESCRIPTION OF THE DRAWINGS

The present solution will be described with reference to the following drawing figures, in which like numerals represent like items throughout the figures.

DETAILED DESCRIPTION

Figure 1:
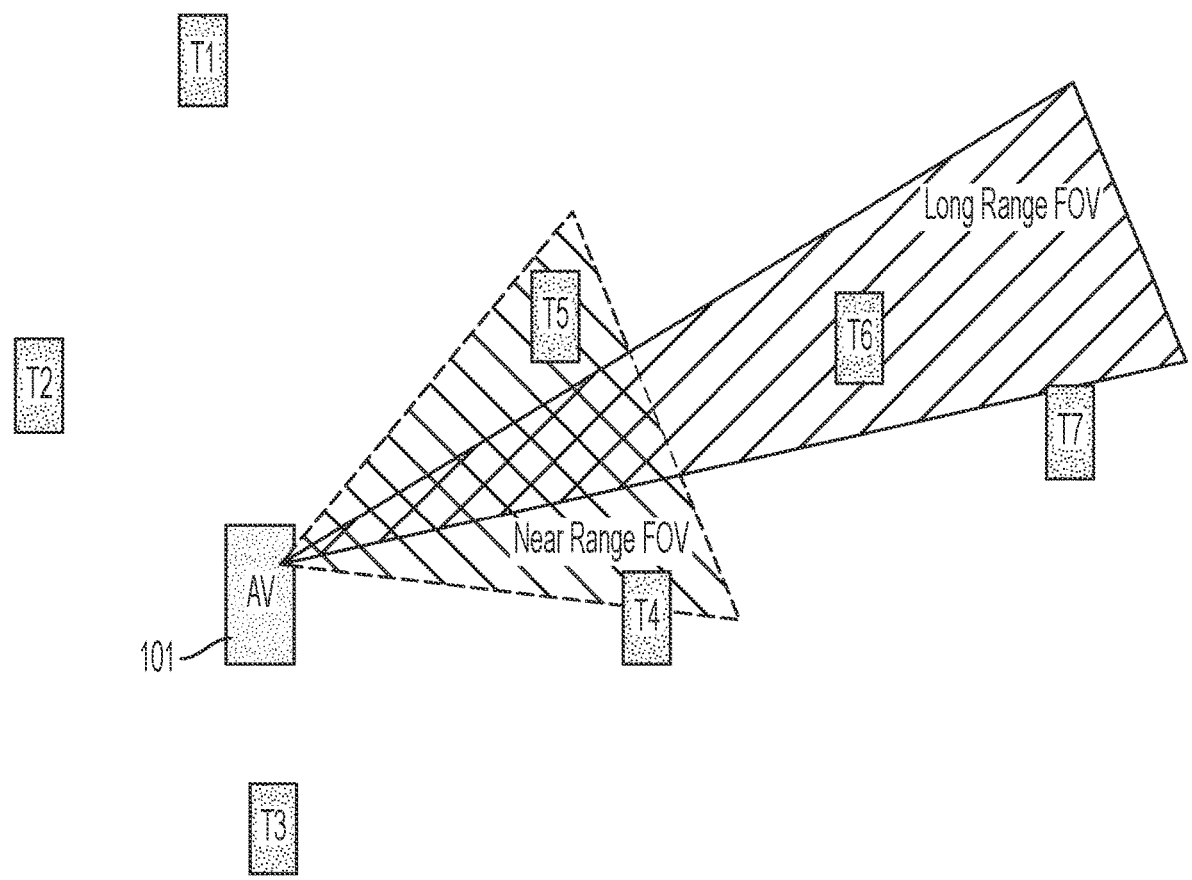
FIG. 1 is an illustration of a block diagram of a sensor's field of view (FOV) that includes a subset of the tracked objects.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "module" refers to a set of computer-readable programming instructions, as executed by a processor, that cause the processor to perform a specified function.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Autonomous vehicle perception relies on measurements from various sensors (e.g., cameras, LiDAR systems, radar systems and/or sonar systems). Radar systems may be incorporated with a sensor suite on autonomous vehicles to complement other sensor systems, such as LiDAR systems, image capturing systems (e.g., monocular or stereoscopic cameras), proximity sensors, sonar systems, and the like. While LiDAR and image capturing systems have significant advantages in positioning and angular surveying, they are comparatively insensitive in providing relative velocity data of objects of interest. Furthermore, LiDAR and image capturing systems are sensitive to inclement weather conditions (e.g., fog, mist, rain, or snow), whereas radar systems are largely invariant to such conditions. This makes radar useful in cross-validation of perception and prediction processes in the analysis engines of the autonomous vehicle, and detection of distant objects of interest before detection by other sensor systems.

Since every sensor measurement changes the probabilities of existence of objects and articles in a specific space at a specific time, multi-sensor data association is a fundamental problem in distributed multi-target multi-sensor tracking systems and involves finding the most probable association between object tracks. Specifically, data association is the process of associating the sensing space (sensor detections) and the track representation space (tracks generated by tracking systems). This is a challenging problem for a number of reasons such as each sensor may only observe a portion of the total number of objects, sensor accuracy, sensor bias, or the like. In addition, the problem space grows exponentially with the number of objects and sensors, making direct enumeration of the possible associations impractical for even modestly sized problems. Due to the increasing usage of many high resolution environment perception sensors for automotive applications, the on-board automotive computing and network elements are often insufficient to handle the requirements of a sensor fusion architecture. For example, radar detection rate is higher compared to other sensors and resolving radar data association can consume valuable on-board computational resources of the autonomous vehicle's control system leading to latencies in the radar data processing pipeline. To reduce the burden on the computational resources in radar data processing pipeline, the systems and methods disclosed in this document utilize information about the field of view (FOV) of a sensor to intelligently select object tracks for data association with sensor measurements for predicting track states, instead of analyzing the complete object track dataset during the association step.

Specifically, when associating tracks to sensor detections, tracks need to be extrapolated and/or predicted to the detection ToV (time of validity) for valid association. The disclosure describes advantageous utilization of prior knowledge of a radar sensor's FOV coverage associated with far and near range sensor scans to shrink the track representation space and hence reduce resource usage. For example, as illustrated in FIG. 1, a total of 7 objects (T1-T7) have been tracked by the sensor system of autonomous vehicle 101. Amongst the 7 objects, only T4 and T5 fall within the FOV of, for example, a near range scan of the passenger side front radar on the autonomous vehicle 101, while only T6 and T7 fall into the FOV of far range scan of the same radar. As a result, the system can prefilter the tracks and only predict the track states of T4 and T5 for the near range scan, T6 and T7 for the far range scan such that the track representation space is reduced from 7 objects to 2 objects for the far range scan and the near range scan.

Therefore, this document describes shrinking the track representation space to allow faster association because when the extrapolations of tracks are time consuming, the shrinking of track representation space can accelerate the association. For radar sensors, in addition to the onboard computing budget being constrained, the radar detection rate is higher compared to other sensors such that it is often challenging for the radar processing pipeline to finish processing one message before the next message arrives. This disclosure describes systems and methods for optimizing the radar processing pipeline while not sacrificing the performance by pre-eliminating the computation of predicting and/or extrapolating for unrelated tracks (i.e., shrink the track representation space) within the radar data association module.

Figure 2:
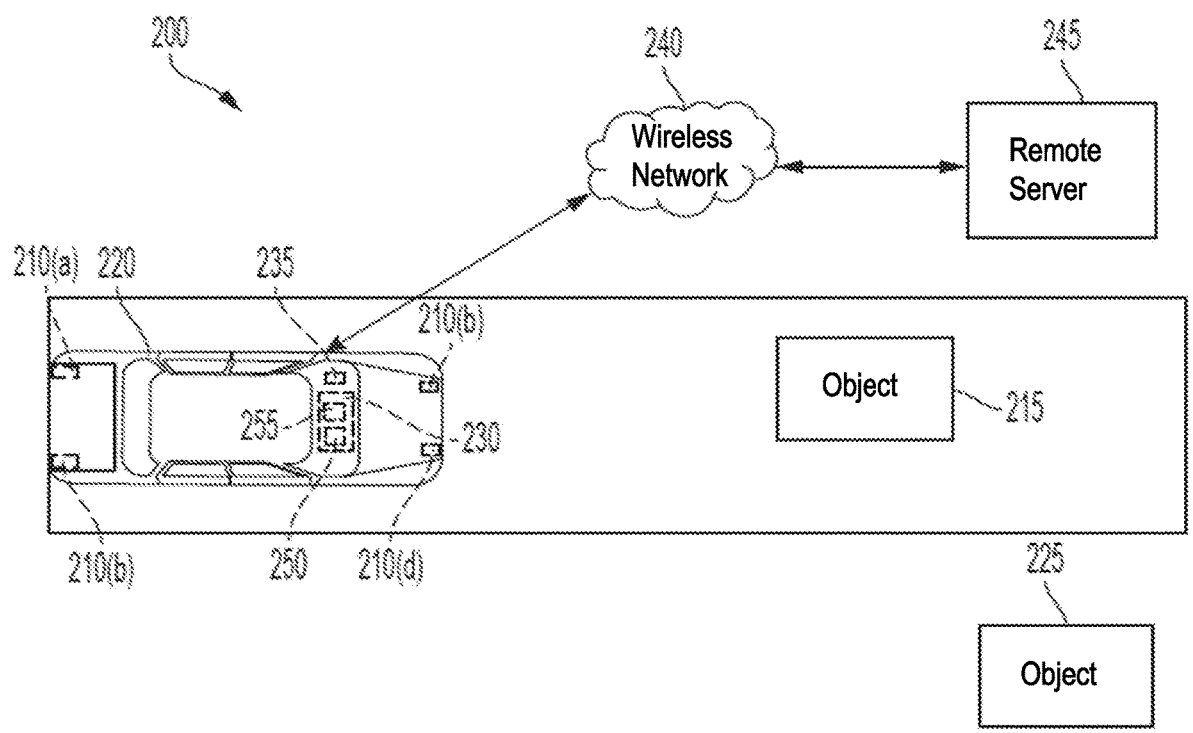
FIG. 2 illustrates a block diagram of a sensor data processing system.

FIG. 2 is a block diagram of a sensor data processing system 200 in accordance with this disclosure. As shown in FIG. 2, a vehicle sensing system 210 for detecting objects around a vehicle 220 may include a first sensor 210(a), a second sensor 210(b), a third sensor 210(c), and a fourth sensor 210(d), etc. coupled to the vehicle 220. Each of the sensors detects objects (e.g., 215 and 225) within a sensed region surrounding the vehicle 220. The sensing system 210 may, for example, include image capturing devices (e.g., cameras), RADAR systems, light detection and ranging (LIDAR) systems, and/or one or more other suitable sensor types. As shown in FIG. 1, tracked objects may lie within and/or outside a particular sensor's FOV. The one or more sensors 210 may be positioned at various positions of the vehicle 220 such as, for example, the front, rear, and/or sides of the vehicle 220 and/or any other suitable position or positions. The sensing system 210 may include one or more radar sensors. According to various embodiments, the vehicle 220 may include a plurality of sensors encircling the vehicle 220.

An example sensor may include a radar sensor that includes a transmitter and a receiver. The transmitter transmits a high-frequency signal in, for example, a millimeter wave that hits an object and bounce back to the receiver, determining the objects' distance, velocity and direction. The radar detects a position of a target object within a detection range which is a region in a predetermined detection angle (FOV) in which a target object is detectable. Specifically, the radar transmits probe waves at predetermined time intervals, and receives reflected waves by a plurality of antennas included in the receiver. A distance to the detected object is calculated on the basis of a time at which the probe waves are transmitted and a time at which the reflected waves are received. Furthermore, the radar calculates a relative velocity on the basis of a frequency of the reflected waves reflected by the detected object. The frequency is changed due to the Doppler effect. In addition, the radar calculates an azimuth of the detected object on the basis of a phase difference of the reflected waves received by the receiver. When a range and an azimuth of a detected object are obtained, a relative position of the detected object with respect to the vehicle can be determined. The radar performs the transmission of probe waves, the reception of reflected waves, and the calculation of a reflection position and a relative velocity at predetermined time intervals, and transmits the calculated reflection position and relative velocity to other components of the system such as a vehicle controller.

The perception module of the vehicle 220 may include one or more computing devices 230 configured to receive sensor data pertaining to each of the objects in the vehicle's environment. The sensor data is generated by one or more sensors of the sensing system 210. The computing device 230 may be in electronic communication with the one or more sensors of the sensing system 210.

The vehicle 220 may include a geographic location system configured to determine a location and orientation of the vehicle 220 and/or one or more of the objects in the vehicle's environment. The geographic location system may include a Global Positioning System device. It is noted, however, that other forms of geographic location may additionally, or alternatively, be used.

The vehicle 220 may further include a transceiver 235 configured to send and receive digital information from a remote server 245 via a wired and/or wireless connection such as, for example, through a wireless communication network 240, wherein the vehicle 220 and the remote server 245 are in electronic communication with each other. The computing device 230 may include a processor 250. The processor 250 may be configured to receive, using the transceiver 235, information pertaining to features of the environment at the location of the vehicle 220, and use the information and the orientation of the vehicle 220 to identify one or more objects in the environment of the vehicle. It is noted that the processor 250 may be a standalone processor 250, the vehicle's 220 processor 250, and/or the remote server's 245 processor 250. Data processed by the processor 250 may be data received from the vehicle 220, received from the remote server 245, and/or a combination of data received from the vehicle 220 and the remote server 245. According to various embodiments, the computing device 230 may include one or more digital memory devices 255 and some or all of the digital information may be stored locally at the vehicle 220.

Each of the sensors 210 is configured to sense and generate data pertaining to the objects in the vehicle's environment. The processor 250 is configured to analyze the sensor 210 data in order to detect each of the objects and may determine, for each object a type of object (e.g., vehicle, pedestrian, bicycle, and/or another other suitable type of object), whether the object is in motion, and/or, if the object is in motion, a velocity and trajectory of the object.

The one or more computing devices 230 may include and/or provide functions of the perception module of the vehicle 220 and the motion planning module of the vehicle 220. The perception module executes programming instructions to process the perception data received from the AV's sensors and identify objects that appear in the perception data. Categorical labels that the perception module may apply to perception data include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in Yurtsever et al., "A Survey of Autonomous Driving: Common Practices and Emerging Technologies" (published in *IEEE Access*, April 2020). The motion planning module will process data received from the other systems, determine a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2016).

For example, frames of sensor data (e.g., radar data) may initially be processed by an object detection module. The object detection module may filter multi-channel radar signals to detect objects and to estimate the range and range rate of any detected objects. Range rate, which may also be referred to as radial velocity, is the rate of change of the range. In addition, variances for the range, elevation, azimuth, range rate estimates, etc. may be determined. A position estimation module may estimate the positions of any detected objects relative to the sensor location. For example, for radar sensor data, the elevation and azimuth for each detected object may be estimated. In addition, variances for the elevation and azimuth estimates may be determined.

An object tracking module may track detected objects over time and perform data association of new data with object tracks, according to any now or hereafter known object tracking methods. For example, the object tracking module may receive the estimated spherical coordinates, i.e., the range, the elevation, and the azimuth, the estimated range rate, and the corresponding variances for each of the detected objects in each frame of radar signal data and uses this information to track the objects over time. Moreover, the object tracking module can determine the likelihood of a tracked object being within the FOV of the sensor, as will be described in greater detail below. Thus, if a tracked object is determined to be outside the sensor FOV, then the tracks relating to such objects may be suppressed during data association and/or tracking steps.

In an object tracking process, the data association step is usually the first one and includes matching of new reported observations to the current tracks. Specifically, data association assigns a sensor measurement to a track, initializes new tracks and/or detects and rejects sensor measurements. The following disclosure describes intelligent selection of object tracks that will undergo data association for efficient utilization of memory and computational resources on-board an autonomous vehicle. It should be noted that while the systems and methods are described with radar data association as example, the disclosure is not so limiting and similar principles can be used for other types of sensor data.

Figure 3:
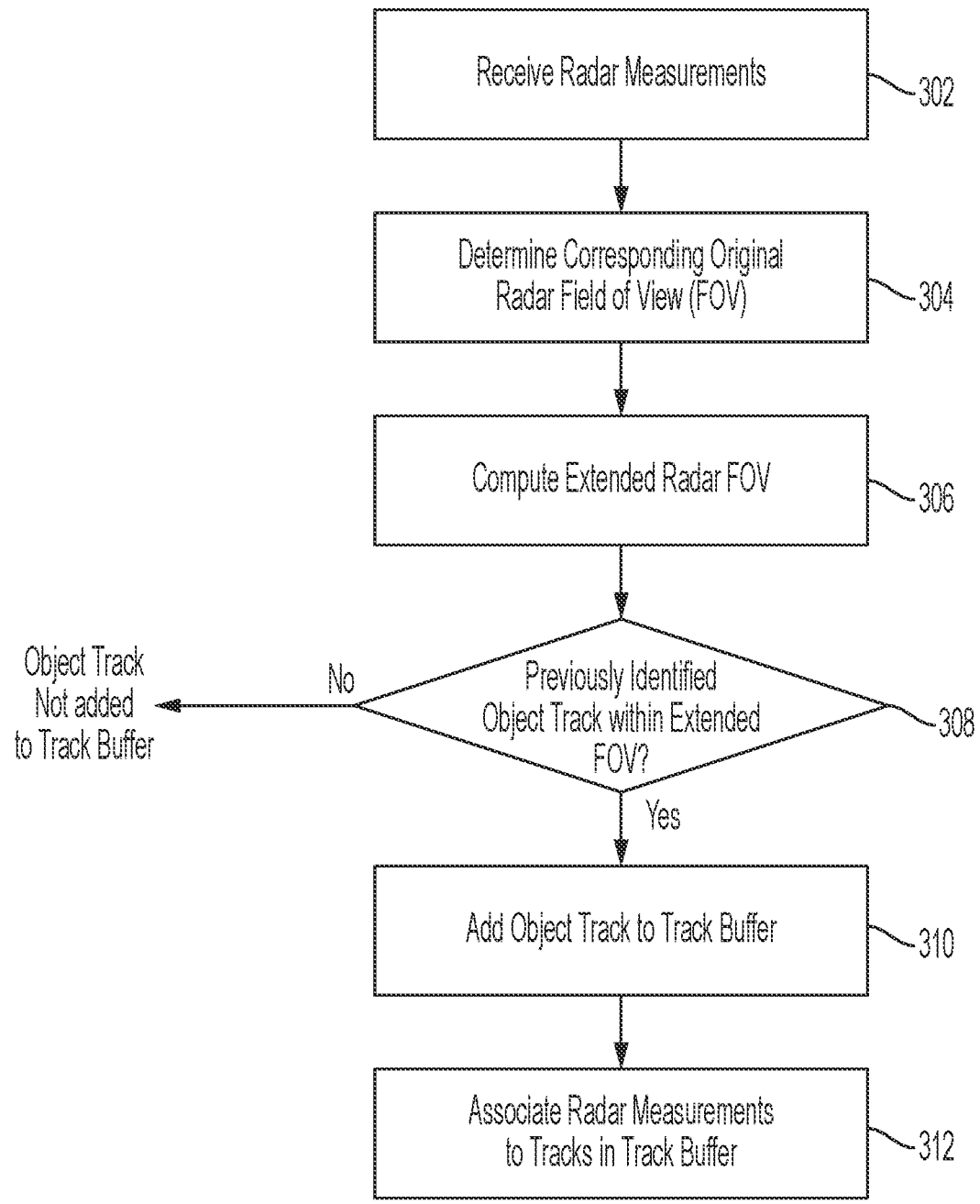
FIG. 3 provides a flow diagram of an illustrative method for object detection and tracking using radar measurements.

FIG. 3 is a process flow chart depicting an example process for object detection and tracking using sensor data (e.g., radar sensor data) captured by one or more sensors (e.g., sensors 210 of FIG. 2) coupled to a vehicle is illustratively depicted. The order of operation within the method is not limited to the sequential execution as illustrated in the figure but may be performed in one or more varying orders as applicable and in accordance with the present disclosure. In various embodiments, the method can be scheduled to run based on one or more predetermined events, and/or can run continuously during operation of a vehicle. All of the operations performed in blocks by the on-board computing device (e.g., 230 of FIG. 2) of a vehicle.

The example process 300 includes receiving radar measurements taken by a radar system (302). The radar measurements may include position data, velocity data, or the like for one or more detected objects during a specific time period.

The radar measurements may be received directly from a radar sensor or a network interface. Sensors have different scan modes with corresponding operating ranges and angular coverages (field of view "FOV"), and are capable of estimating different parameters within their operating range. The system may assess received radar measurements to determine the scan mode of the radar measurements (for example, based on metadata and/or other information associated with the received radar measurements), and determine the corresponding original radar FOV space (304). Automotive radars typically have two scan modes transmitting alternatively: near range and far range scans. An example near range scan may cover objects within about 0.2 to about 100 meters range of radar with wide azimuth coverage from about -75 to 75 degrees (region 402 within the solid lines in FIG. 4A). An example far range scan may cover objects from about 0.2 to about 250 meters in range of radar with narrow azimuth coverage from around -10 to 10 degrees (region 414 within the solid lines in FIG. 4B). Therefore, the system may determine the original radar FOV space in the sensor frame of reference as (θ, r) based on the scan mode, where: $\theta \in [\theta_{lower}, \theta_{upper}]$, $r \in [r_{lower}, r_{upper}]$.

The system may then compute an extended radar FOV space (306). Specifically, a tracked object may move between the latest track time and the radar sensor measurement time. In order to accommodate, for a tracked object, the extended object length and movement during the time difference between latest track ToV (time of validity) and radar scan ToV, the process includes extending the original radar FOV in both range and azimuth. The extension of radar FOV depends on the original radar FOV space, and, hence, the scan mode of the radar. The process may include modifying the original FOV boundary (or space) to accommodate the extended object and time difference between radar and latest track for near range scans (shaded region 404 in FIG. 4A) and for far range scans (shaded region 412 in FIG. 4B).

Figure 4A:
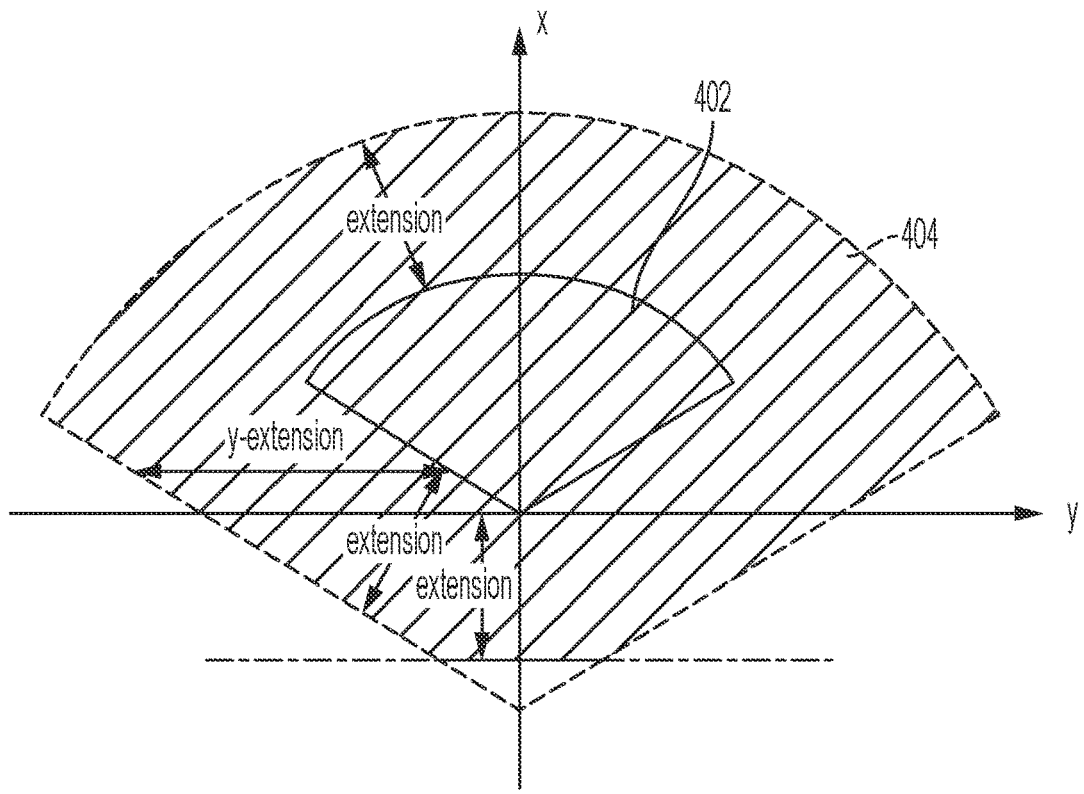
FIGS. 4A and 4B illustrate original and extended FOVs for near and far range radar scans, respectively.
Figure 4B:
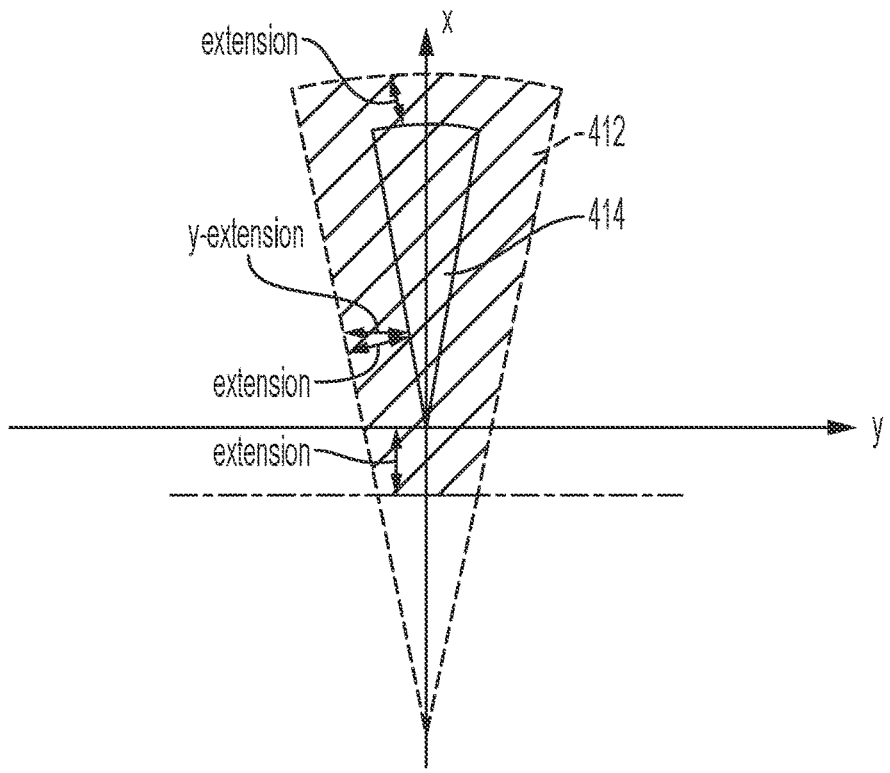

The extension FOV spaces 404 and 412 in FIGS. 4A and 4B may, for example, be determined by extending the original FOV space boundary of a radar measurement using an extension value and a y_extension value. As shown in FIGS. 4A and 4B, the extension value and a y_extension value are used to extend the boundary of the original FOV spaces 402 and 412 to generate extension FOV spaces 404 and 414, respectively. Specifically, the y_extension value is used to extend the azimuth coverage (along y axis), while the extension value is used to extend the range coverage of the of the original FOV spaces 402 and 412 to generate extension FOV spaces 404 and 414, respectively.

An example extension value may be determined as follows:

$$\text{extension} = 0.5 L_{max} + v_{max}(t_{radar} - t_{track\_feedback})_{max} \quad (1)$$

where, $L_{max}$ is the maximum length of the detected object; $v_{max}$ is the maximum speed of the detected object; $(t_{radar} - t_{track\_feedback})_{max}$ is the maximum time difference between $t_{radar}$ which is the ToV of the radar scan; and $t_{track\_feedback}$ is the ToV of the latest track feedback (i.e., last sensor time used to perform sensor fusion for a track). In certain embodiments relating to radars mounted on vehicles, the system may use the length of an 18-wheeler truck as the $L_{max} = 25$ m; $v_{max} = 120$ mph; and $(t_{radar} - t_{track\_feedback})_{max} = 300$ ms. However, these values are not limiting, and any other suitable values may be used to determine the extended radar FOV space. Additionally and/or alternatively, the extension value may differ in different directions around the original FOV space (not shown here).

The y_extension value may be determined using the following equation: $y\_extension = \text{extension}/\cos(\theta_{upper})$ where $\theta_{upper}$ is determined from the original FOV space for a particular scan type.

In various embodiments, extension value, y_extension value, and/or $\theta_{upper}$ may be predetermined for different types of radar scans such that they are computed only once and saved when the scan class is constructed to further reduce computational resources.

At 308, the system may then determine whether a previously identified object track lies within the extended FOV of the current radar scan. An example process may utilize a non-linear Boolean function $f(x, y)$ to determine whether a point (e.g., a track center or box center of a track) is within the extended FOV of the current radar scan. Specifically, for an arbitrary track location $(x_0, y_0)$ to be within the extended FOV space (404 or 412), the process may design a non-linear Boolean function $f(x, y)$, where $f(x_0, y_0)$=true if it satisfies equations (2)-(4):

$$|y_0| \leq x_0 \tan(\theta_{upper}) + y\_extension \quad (2)$$

$$x_0 \geq -\Delta_{max} \quad (3)$$

$$\sqrt{x_0^2 y_0^2} \leq r_{upper} + \text{extension} \quad (4)$$

Only the tracks corresponding to points for which $f(x_0, y_0)$=true lie within the extended FOV space of a current radar scan. ($x_0 \leq -\Delta_{max}$) bounds the x-coordinate. For example, if x of a track is more than a threshold distance ($\Delta_{max}$) behind the radar, the track is not included in the buffer.

Therefore, for determining whether a previously identified track ($T_i$) lies within the extended FOV of the current radar scan, the system may first compute the origin of the track, a track frame, a box center of a track, or the like; and transform it into the sensor frame of reference (using any known or hereafter known techniques) in order to determine a point ($x_i, y_i$) in the sensor frame of reference. The system may then compute the value of $f(x_i, y_i)$ and determine whether $f(x_i, y_i)$=true.

If the previously identified object track lies within the extended FOV space (308: YES), the system may add the object track to a track buffer for object tracking (310). However, if the previously identified object track does not lie within the extended FOV space (308: NO), the object track is not added to the track buffer. In this manner, a reduced track buffer (i.e., track representation space) is generated.

At 312, the system may perform association of the received radar measurements to object tracks included in the track buffer for object tracking. For example, the system may get the time validity of current radar scan (ToV) and predict all tracks in the buffer into the current ToV using any known or hereafter known methods. The system may then determine, for each predicted track, whether the position distance (e.g., a mahalanobis distance between the point distribution corresponding to the track) and the received data measurement is greater than a threshold. If the distance is greater than the threshold, the track/measurement is determined to not be associated with a currently tracked object.

However, if the distance is less than or equal to the threshold, the system may determine a refined distance between the predicted track and the sensor measurement by computing a fused range rate and position distance between the sensor measurement and the track. The sensor measure may be assigned to or associated with the track in the track buffer that has the shortest computed refined distance from the sensor detection. Optionally, the associated object track may be updated based on the radar measurement. Current tracking information for all objects being tracked, including new detected objects, may be transmitted to one or more vehicle control systems, for further processing.

The above disclosure reduces computing and memory resource requirements for track association by, for example, reducing the number of tracks that need to be associated with a sensor measurement (reduction in track representation space) and/or reducing the processing required because a fewer number of tracks are extrapolated or predicted to the detection ToV for valid association.

It should be noted that while the above disclosure describes formation of an extended radar FOV for creation of a reduced track representation space, and using the reduced track representation space for association of radar measurements with detected objects tracks, the disclosure is not so limiting. For example, similar principles can be used for performing associations between radar tentative tracks and mature tracks generated from tracking filters. Specifically, the above disclose describes association of radar detections (i.e., scan points) to tracks, and similar principles may be used for association of tentative tracks (radar detections grouped based on their distance and range rate relations (segmentation of radar detections) that yield radar tentative tracks as groups of radar detections) to previously identified mature tracks. Similarly, similar principles can be formation of extended FOVs for other sensors (e.g., LiDAR, sonar, camera, etc.), and using the corresponding reduced track representation space for association of sensor measurements with detected objects tracks.

The above example approach may be iterative. Specifically, the system continually emits radiation, detects reflected radiation, and tracks objects based on those detections. In some embodiments, track representation space (i.e., the track buffer) may be updated many times per second.

The disclosed example embodiments improve object detection and tracking, and automated or semi-automated vehicle control in an efficient manner. Example embodiments of this disclosure help a vehicle to accurately identify and track a detected object, and thus logically determine how to treat the object. Further, the described data association technique is particularly suited to applications such as automotive applications as the technique can be implemented using on-board computing devices with memory and processing constraints. Furthermore, one of ordinary skill in the art will understand that the object tracking described herein may be used for other applications that employ radar and need to track objects, e.g., tracking movement of people in a house or building in surveillance and security applications, tracking human movement inside a vehicle, and maneuvering a robot in a factory or warehouse.

Figure 5:
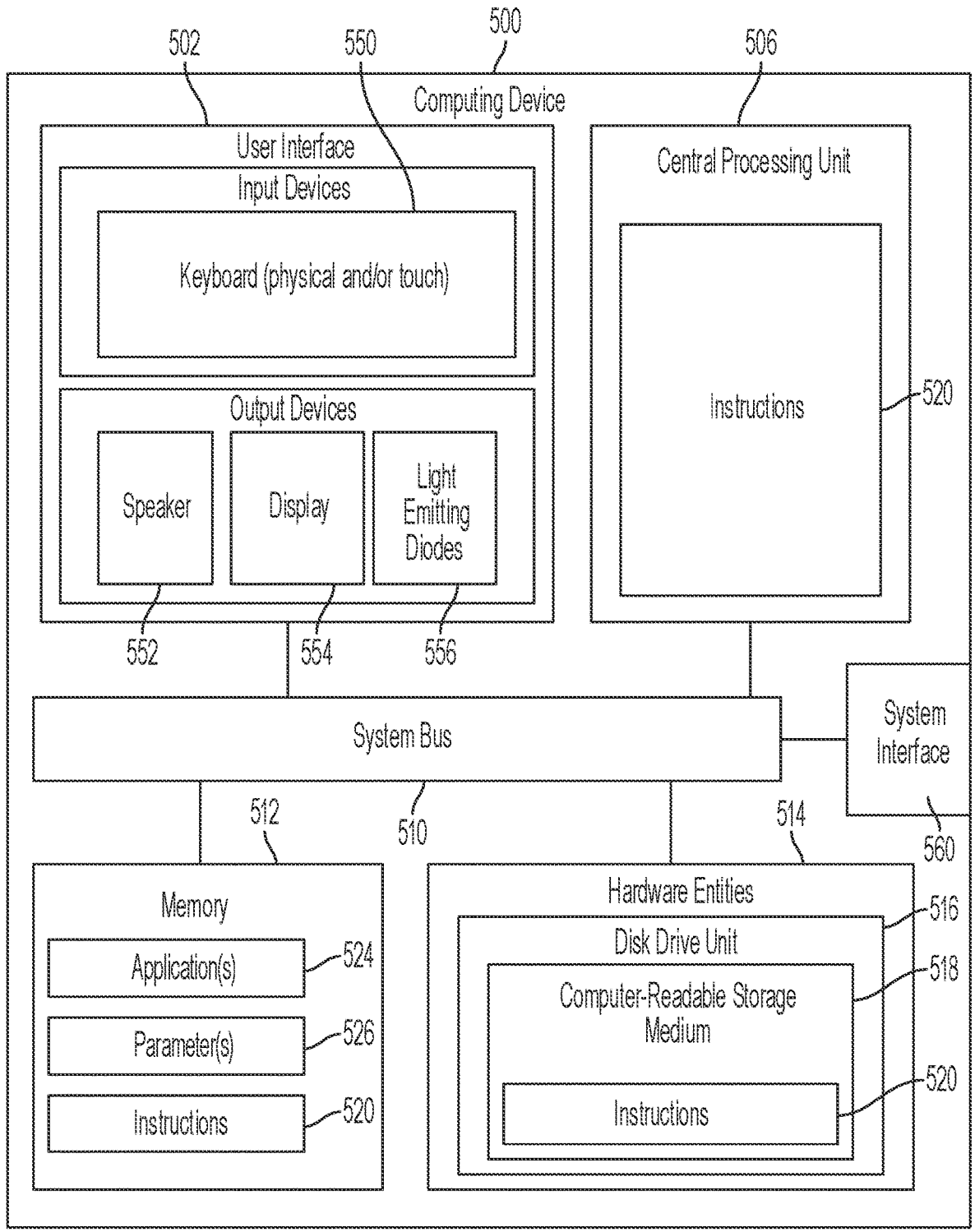
FIG. 5 is an illustration of various elements of an illustrative computing device, in accordance with the present disclosure.

Referring now to FIG. 5, an illustration of an illustrative architecture for a computing device 500 is provided. The computing device 230 of FIG. 2 is the same as or similar to computing device 500. As such, the discussion of computing device 500 is sufficient for understanding the computing device 230 of FIG. 1.

Computing device 500 may include more or less components than those shown in FIG. 1. However, the components shown are sufficient to disclose an illustrative solution implementing the present solution. The hardware architecture of FIG. 5 represents one implementation of a representative computing device configured to one or more methods and means for object detection, as described herein. As such, the computing device 500 of FIG. 5 implements at least a portion of the method(s) described herein.

Some or all components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, a system interface 560, and hardware entities 514 connected to system bus 510. The user interface can include input devices and output devices, which facilitate user-software interactions for controlling operations of the computing device 500. The input devices include, but are not limited to, a physical and/or touch keyboard 550. The input devices can be connected to the computing device 500 via a wired or wireless connection (e.g., a Bluetooth® connection). The output devices include, but are not limited to, a speaker 552, a display 554, and/or light emitting diodes 556. System interface 560 is configured to facilitate wired or wireless communications to and from external devices (e.g., network nodes such as access points, etc.).

At least some of the hardware entities 514 perform actions involving access to and use of memory 512, which can be a random access memory ("RAM"), a disk drive, flash memory, a compact disc read only memory ("CD-ROM") and/or another hardware device that is capable of storing instructions and data. Hardware entities 514 can include a disk drive unit 516 comprising a computer-readable storage medium 518 on which is stored one or more sets of instructions 520 (e.g., software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 520 for execution by the computing device 500 and that cause the computing device 500 to perform any one or more of the methodologies of the present disclosure.

Figure 6:
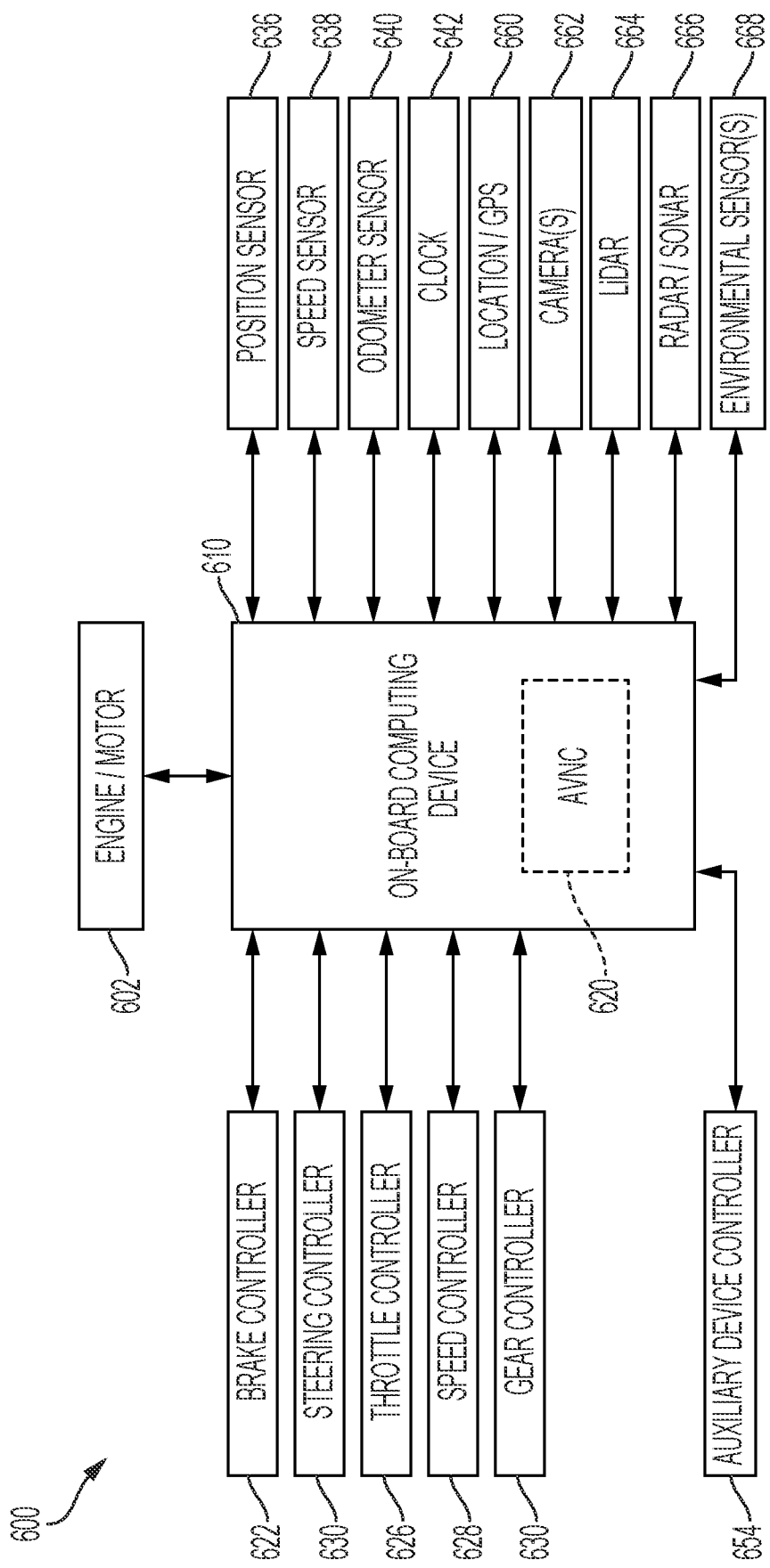
FIG. 6 illustrates example elements of an autonomous vehicle, in accordance with various embodiments of the present disclosure.

FIG. 6 illustrates an example system architecture 600 for a vehicle, such as an autonomous vehicle (e.g., vehicle 220, as shown in FIG. 2). The vehicle 220 may include an engine or motor 602 and various sensors for measuring various parameters of the vehicle and/or its environment. Operational parameter sensors that are common to multiple types of vehicles include, for example: a position sensor 636 such as an accelerometer, gyroscope and/or inertial measurement unit; a speed sensor 638; and an odometer sensor 640. The vehicle 220 also may have a clock 642 that the system architecture 600 uses to determine vehicle time during operation. The clock 642 may be encoded into the vehicle on-board computing device 610, it may be a separate device, or multiple clocks may be available.

The vehicle 220 also may include various sensors that, together with a processor and programming instructions, serve as the object detection system that operates to gather information about the environment in which the vehicle is traveling. These sensors may include, for example: a location sensor 660 such as a GPS device; object detection sensors such as one or more cameras 662; a radar sensor system 664; and/or a LiDAR and or and/or a sonar system 666. The sensors also may include environmental sensors 668 such as a precipitation sensor and/or ambient temperature sensor. The object detection sensors may enable the vehicle 220 to detect objects that are within a given distance or range of the vehicle 220 in any direction, while the environmental sensors collect data about environmental conditions within the vehicle's area of travel. The system architecture 600 will also include one or more cameras 662 for capturing images of the environment. Any or all of these sensors will capture sensor data that will enable one or more processors of the vehicle's on-board computing device 610 (for example, computing device 230 and/or 500) and/or external devices to execute programming instructions that enable the computing system to classify objects in the perception data, and all such sensors, processors and instructions may be considered to be the vehicle's perception system. The vehicle also may receive state information, descriptive information or other information about devices or objects in its environment from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle that may encounter or affect in its environment.

During operations, information is communicated from the sensors to an on-board computing device 610. The on-board computing device 610 analyzes the data captured by the sensors and optionally controls operations of the vehicle based on results of the analysis. For example, the on-board computing device 610 may control braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers such as an auxiliary device controller 664. The on-board computing device 610 may include an autonomous vehicle navigation controller 620 configured to control the navigation of the vehicle through an intersection. In some embodiments, the intersection may include traffic signal lights. In some embodiments, an intersection may include a smart node. In some embodiments, the on-board computing device 610 may be configured to switch modes (augmented perception mode and non-augmented perception mode) based on whether Augmented Perception Data (APD) is available if the vehicle is in-range of an intersection.

Geographic location information may be communicated from the location sensor 660 to the on-board computing device 610, which may then access a map of the environment that corresponds to the location information to determine known fixed features of the environment such as streets, buildings, stop signs and/or stop/go signals. Captured images from the cameras 662 and/or object detection information captured from sensors such as a LiDAR system 664 is communicated from those sensors) to the on-board computing device 610. The object detection information and/or captured images may be processed by the on-board computing device 610 to detect objects in proximity to the vehicle 220. In addition or alternatively, the vehicle 220 may transmit any of the data to a remote server system for processing. Any known or to be known technique for making an object detection based on sensor data and/or captured images can be used in the embodiments disclosed in this document.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for detecting and tracking objects using radar data, the method comprising: receiving, from a radar sensor associated with a vehicle, measurement data corresponding to an environment of the vehicle;
identifying, from a plurality of previously determined object tracks, one or more object tracks that lie within an extended field of view (FOV) of the radar sensor, the extended FOV being based on an original FOV of the radar sensor, wherein the original FOV is based on sensed data measured by the radar sensor, wherein the extended FOV of the radar sensor is computed by (i) extending an azimuth coverage of the original FOV and (ii) extending a range of the original FOV, and wherein (i) the original FOV includes an outer periphery corresponding to an outer boundary of the sensed data, (ii) the extended FOV includes the original FOV and an extended area, (iii) the extended area extends outward from an entirety of the outer periphery of the original FOV, (iv) the extended area extends outward from the outer periphery at a calculated extension length, and (v) the calculated extension length is based on a dimension and a speed of a detected object;
tracking the detected object within the extended area;
performing association of the measurement data with the one or more object tracks to identify an associated object track; and
outputting the associated object track and the measurement data to a navigation system of the vehicle.

2. The method according to claim 1, further comprising using the associated object track to control navigation of the vehicle.

3. The method according to claim 1, further comprising identifying the original FOV of the radar sensor by determining, based on the measurement data, a scan mode of the radar sensor.

4. The method according to claim 1, further comprising adding the one or more object tracks to a track buffer representative of a reduced track representation space.

5. The method according to claim 1, wherein identifying the one or more object tracks comprises, for each of the plurality of previously determined object tracks:
identifying a track center point for that object track;
transforming the track center point to a frame of reference corresponding to the radar sensor; and
determining whether that track center point lies within the extended FOV of the radar sensor.

6. The method according to claim 1, wherein the extended FOV of the radar sensor accounts for a difference between a time of validity (ToV) of a latest track prediction of an object track and a ToV of the measurement data.

7. The method according to claim 1, wherein performing association of the measurement data with the one or more object tracks to identify the associated object track comprises:
identifying the associated object track as an object track of the one or more object tracks that has a shortest refined distance from among respective refined distances between each of the one or more object tracks and the measurement data, each refined distance being based on a fused range rate and a position distance between the measurement data and the object track.

8. The method according to claim 1, wherein the dimension is a length of the detected object, wherein the calculated extension length is based on a sum of (i) a fraction of the length of the detected object and (ii) a product of (a) the speed of the detected objection and (b) a difference, wherein the difference is a difference between (I) a time of validity (ToV) of a scan of the radar sensor and (II) a ToV of a track feedback.

9. A system for detecting and tracking objects, the system comprising: a processor; and
a non-transitory computer readable medium comprising programming instructions that when executed by the processor will cause the processor to:
receive, from a radar sensor associated with a vehicle, measurement data corresponding to an environment of the vehicle,
identify, from a plurality of previously determined object tracks, one or more object tracks that lie within an extended field of view (FOV) of the radar sensor, the extended FOV being based on an original FOV of the radar sensor, wherein the original FOV is based on sensed data measured by the radar sensor, wherein the extended FOV of the radar sensor is computed by (i) extending an azimuth coverage of the original FOV and (ii) extending a range of the original FOV, and wherein (i) the original FOV includes an outer periphery corresponding to an outer boundary of the sensed data, (ii) the extended FOV includes the original FOV and an extended area, (iii) the extended area extends outward from an entirety of the outer periphery of the original FOV, (iv) the extended area extends outward from the outer periphery at a calculated extension length, and (v) the calculated extension length is based on a dimension and a speed of a detected object;
tracking the detected object within the extended area;
perform association of the measurement data with the one or more object tracks to identify an associated object track, and
output the associated object track and the measurement data to a navigation system of the vehicle.

10. The system according to claim 9, further comprising programming instructions that when executed by the processor will cause the processor to use the associated object track to control navigation of the vehicle.

11. The system according to claim 9, further comprising programming instructions that when executed by the processor will cause the processor to identify the original FOV of the radar sensor by determining, based on the measurement data, a scan mode of the radar sensor.

12. The system according to claim 9, further comprising programming instructions that when executed by the processor will cause the processor to add the one or more object tracks to a track buffer representative of a reduced track representation space.

13. The system according to claim 9, wherein the programming instructions that when executed by the processor cause the processor to perform association of the measurement data with the one or more object tracks to identify the associated object track comprise programming instructions to:

identify the associated object track as an object track of the one or more object tracks that has a shortest refined distance from among respective refined distances between each of the one or more object tracks and the measurement data, each refined distance being based on a fused range rate and a position distance between the measurement data and the object track.

14. The system according to claim 9, wherein the dimension is a length of the detected object, wherein the calculated extension length is based on a sum of (i) a fraction of the length of the detected object and (ii) a product of (a) the speed of the detected objection and (b) a difference, wherein the difference is a difference between (I) a time of validity (ToV) of a scan of the radar sensor and (II) a ToV of a track feedback.

15. A computer processor comprising a memory that stores programming instructions that are configured to:
receive, from a radar sensor, measurement data corresponding to an environment of a vehicle;
identify, from a plurality of previously determined object tracks, one or more object tracks that lie within an extended field of view (FOV) of the radar sensor, the extended FOV being based on an original FOV of the radar sensor, wherein the original FOV is based on sensed data measured by the radar sensor, and wherein the extended FOV of the radar sensor is computed by (i) extending an azimuth coverage of the original FOV and (ii) extending a range of the original FOV, and wherein (i) the original FOV includes an outer periphery corresponding to an outer boundary of the sensed data, (ii) the extended FOV includes the original FOV and an extended area, (iii) the extended area extends outward from an entirety of the outer periphery of the original FOV, (iv) the extended area extends outward from the outer periphery at a calculated extension length, and (v) the calculated extension length is based on a dimension and a speed of a detected object;
tracking the detected object within the extended area;
perform association of the measurement data with the one or more object tracks to identify an associated object track; and
output the associated object track and the measurement data to a navigation system of the vehicle.

16. The computer processor according to claim 15, wherein the memory stores further programming instructions that are configured to cause the processor to use the associated object track to control navigation of the vehicle.

17. The computer processor according to claim 15, wherein the memory stores further programming instructions that are configured to cause the processor to identify the original FOV of the radar sensor by determining, based on the measurement data, a scan mode of the radar sensor.

18. The computer processor according to claim 15, wherein the memory stores further programming instructions that are configured to cause the processor to add the one or more object tracks to a track buffer representative of a reduced track representation space.

19. The computer processor according to claim 15, wherein the programming instruction that are configured to cause the processor to perform association of the measurement data with the one or more object tracks to identify the associated object track comprise programming instructions to:
identify the associated object track as an object track of the one or more object tracks that has a shortest refined distance from among respective refined distances between each of the one or more object tracks and the measurement data, each refined distance being based on a fused range rate and a position distance between the measurement data and the object track.

20. The computer processor according to claim 15, wherein the dimension is a length of the detected object, wherein the calculated extension length is based on a sum of (i) a fraction of the length of the detected object and (ii) a product of (a) the speed of the detected objection and (b) a difference, wherein the difference is a difference between (I) a time of validity (ToV) of a scan of the radar sensor and (II) a ToV of a track feedback.

* * * * *